United States Patent
Tobjork

(10) Patent No.: US 11,650,176 B2
(45) Date of Patent: May 16, 2023

(54) SEMICONDUCTOR GAS SENSOR AND GAS SENSING METHOD

(71) Applicant: Sumitomo Chemical Company Limited, Tokyo (JP)

(72) Inventor: Daniel Tobjork, Cambridgeshire (GB)

(73) Assignee: Sumitomo Chemical Company Limited, Tokyo (JP)

( * ) Notice: Subject to any disclaimer, the term of this patent is extended or adjusted under 35 U.S.C. 154(b) by 242 days.

(21) Appl. No.: 16/905,836

(22) Filed: Jun. 18, 2020

(65) Prior Publication Data

US 2020/0400600 A1 Dec. 24, 2020

(30) Foreign Application Priority Data

Jun. 20, 2019 (GB) ..................... 1908843

(51) Int. Cl.
*G01N 27/12* (2006.01)
*G01N 27/30* (2006.01)

(52) U.S. Cl.
CPC ......... *G01N 27/126* (2013.01); *G01N 27/304* (2013.01)

(58) Field of Classification Search
CPC . G01N 27/126; G01N 27/304; G01N 27/4163
See application file for complete search history.

(56) References Cited

U.S. PATENT DOCUMENTS

| | | | |
|---|---|---|---|
| 2005/0247978 A1 | 11/2005 | Weng et al. | |
| 2007/0126061 A1* | 6/2007 | Dodabalapur | G01N 27/4141 257/368 |
| 2007/0295203 A1* | 12/2007 | Shekarriz | G01N 27/4162 204/431 |
| 2017/0067844 A1* | 3/2017 | Vellaisamy | G01N 27/414 |
| 2017/0168000 A1* | 6/2017 | Ichiki | H01L 51/0545 |
| 2018/0052136 A1 | 2/2018 | Diao et al. | |

(Continued)

FOREIGN PATENT DOCUMENTS

| | | |
|---|---|---|
| CN | 107565019 A | 1/2018 |
| CN | 108287189 A | 7/2018 |

(Continued)

OTHER PUBLICATIONS

Combined Search and Examination Report for Application No. GB 1908843.4, dated Dec. 12, 2019.

*Primary Examiner* — Alvaro E Fortich
(74) *Attorney, Agent, or Firm* — Wolf, Greenfield & Sacks, P.C.

(57) ABSTRACT

A method of sensing a target gas in an environment in which a response of a semiconducting gas sensor device upon exposure to the environment is measured. The semiconducting gas sensor device includes first and second electrodes in electrical contact with a doped organic semiconductor layer and is, e.g., an organic thin film transistor or organic chemiresistor. The measured response may be indicative of a cumulative amount of a target gas that the semiconducting gas sensor device has been exposed to. A gas sensor module containing the semiconducting gas sensor device may be connectable to a reader configured to read the semiconducting gas sensor device after exposure to the environment. The connection may be wired or wireless. The target gas may be 1-methylcyclopropene.

15 Claims, 8 Drawing Sheets

(56) References Cited

U.S. PATENT DOCUMENTS

2018/0093814 A1* 4/2018 Espinosa .................. A23L 3/28
2019/0303852 A1* 10/2019 Chopko ............. G06Q 10/0832

FOREIGN PATENT DOCUMENTS

| EP | 0286307 A2 | 10/1988 |
|----|------------|---------|
| KR | 10-2018-0006843 A | 1/2018 |
| WO | WO 2019/106350 A1 | 6/2019 |

* cited by examiner

SEMICONDUCTOR GAS SENSOR AND GAS SENSING METHOD

RELATED APPLICATIONS

This application claims foreign priority benefits under 35 U.S.C. § 119(a)-(d) or 35 U.S.C. § 365(b) of British application number GB 1908843.4, filed Jun. 20, 2019, the entirety of which is incorporated herein.

BACKGROUND

The use of thin film transistors as sensors is disclosed in, for example, Feng et al, "Unencapsulated Air-stable Organic Field Effect Transistor by All Solution Processes for Low Power Vapor Sensing" Scientific Reports 6:20671 DOI: 10.1038/srep20671 and Besar et al, "Printable ammonia sensor based on organic field effect transistor", Organic Electronics, Volume 15, Issue 11, November 2014, Pages 3221-3230.

Matic et al, Sensors (Basel). 2015 November; 15(11): 28088-28098. discloses ethylene measurements with MOx chemiresistive sensors.

Park et al, "Atomic Imaging of the Irreversible Sensing Mechanism of NO2 Adsorption on Copper Phthalocyanine" J. Am. Chem. Soc., 2013, 135 (39), pp 14600-14609 discloses fracturing of a copper phthalocyanine monolayer upon adsorption of NO2.

SUMMARY

In some embodiments of the present disclosure there is provided a method of sensing a target gas in an environment. The method may include measuring a response of a semiconducting gas sensor device upon exposure to the environment. The semiconducting gas sensor device may contain first and second electrodes in electrical contact with a doped organic semiconductor layer. The measured response may be indicative of a cumulative amount of the target gas that the gas sensor has been exposed to.

In some embodiments of the method, the semiconducting gas sensor device is an organic thin film transistor and the first and second electrodes are, respectively, source and drain electrodes of the thin film transistor. Optionally, the response is a change in one or more of a drain current; a resistance; a threshold voltage; a mobility; and a transfer characteristic.

In some embodiments of the method, the semiconducting gas sensor device is an organic chemiresistor. Optionally, the response is a change in resistance.

In some embodiments of the method, the method comprises exposing the semiconducting gas sensor to the environment wherein the semiconducting gas sensor device is attached to an object in the environment. Optionally, the object is a harvested flower, harvested vegetable, harvested fruit or a container thereof. In some embodiments, the method includes measuring the response for each of a plurality of the semiconducting gas sensor devices attached to different objects and exposed to the environment at the same time.

In some embodiments of the method, the semiconducting gas sensor is not connected to a reader configured to read the response during exposure to the environment.

In some embodiments of the method, the response is measured in an environment in which the target gas is not present.

In some embodiments of the method, the semiconducting gas sensor is not connected to a source of electrical energy during at least part of the exposure of the semiconducting gas sensor to the environment In some embodiments of the method, a change in the parameter of a reference device which has not been exposed to the target gas is subtracted from the change in the parameter of the or each semiconducting gas sensor device.

In some embodiments of the method, the target gas is 1-methylcyclopropene.

In some embodiments there is provided gas sensor apparatus including a gas sensor module and a reader module. The reader module may be connectable to the gas sensor module. The gas sensor module may contain a semiconducting gas sensor device having first and second electrodes in electrical contact with a doped organic semiconductor layer. The reader module may be configured to measure a parameter of the semiconducting gas sensor device.

In some embodiments, the semiconducting gas sensor device of the gas sensor module is an organic thin film transistor. Optionally, the parameter is one or more of a drain current, a threshold voltage; a mobility; a resistance and a transfer characteristic.

In some embodiments, the semiconducting gas sensor device of the gas sensor module is an organic chemiresistor. Optionally, the parameter is a resistance.

Optionally, the reader module is configured to provide electrical power to the semiconducting gas sensor device when connected to the gas sensor module.

Optionally, the reader module is configured to wirelessly connect to the gas sensor module.

Optionally, the reader module is configured to wirelessly power the semiconducting gas sensor device. Optionally, the gas sensor module comprises a RFID device.

In some embodiments, there is provided a gas sensor kit containing a reader module and a plurality of gas sensor modules as described herein.

DESCRIPTION OF THE DRAWINGS

The disclosed technology and accompanying figures describe some implementations of the disclosed technology.

Figure 1A:
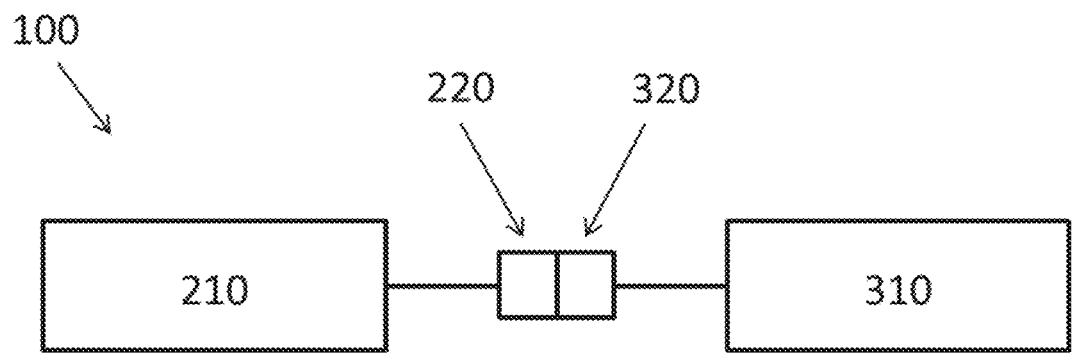
FIG. 1A illustrates gas sensor apparatus including a gas sensor module and a reader module according to some embodiments of the present disclosure in which the gas sensor module and reader module are electrically connected.

The drawings are not drawn to scale and have various viewpoints and perspectives. The drawings are some implementations and examples. Additionally, some components and/or operations may be separated into different blocks or combined into a single block for the purposes of discussion of some of the embodiments of the disclosed technology. Moreover, while the technology is amenable to various modifications and alternative forms, specific embodiments have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, electromagnetic, or a combination thereof. Additionally, the words "herein," "above," "below," and words of similar import, when used in this application, refer to this application as a whole and not to any particular portions of this application. A layer "between" and/or "disposed between" two other layers, as described herein, may be in direct contact with each of the two layers or may be between or may be spaced apart from one or both of the two other layers by one or more intervening layers. As used herein, a material "over" and/or "disposed over" a layer means that the material is in direct contact with the layer or is spaced apart therefrom by one or more intervening layers. As used herein, a material "on" and/or "disposed on" a layer means that the material is in direct contact with the layer. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the technology provided herein can be applied to other systems, not necessarily the system described below. The elements and acts of the various examples described below can be combined to provide further implementations of the technology. Some alternative implementations of the technology may include not only additional elements to those implementations noted below, but also may include fewer elements.

These and other changes can be made to the technology in light of the following detailed description. While the description describes certain examples of the technology, and describes the best mode contemplated, no matter how detailed the description appears, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while some aspect of the technology may be recited as a computer-readable medium claim, other aspects may likewise be embodied as a computer-readable medium claim, or in other forms, such as being embodied in a means-plus-function claim.

In the following description, for the purposes of explanation, numerous specific details are set forth in order to provide a thorough understanding of implementations of the disclosed technology. It will be apparent, however, to one skilled in the art that embodiments of the disclosed technology may be practiced without some of these specific details.

Figure 1B:
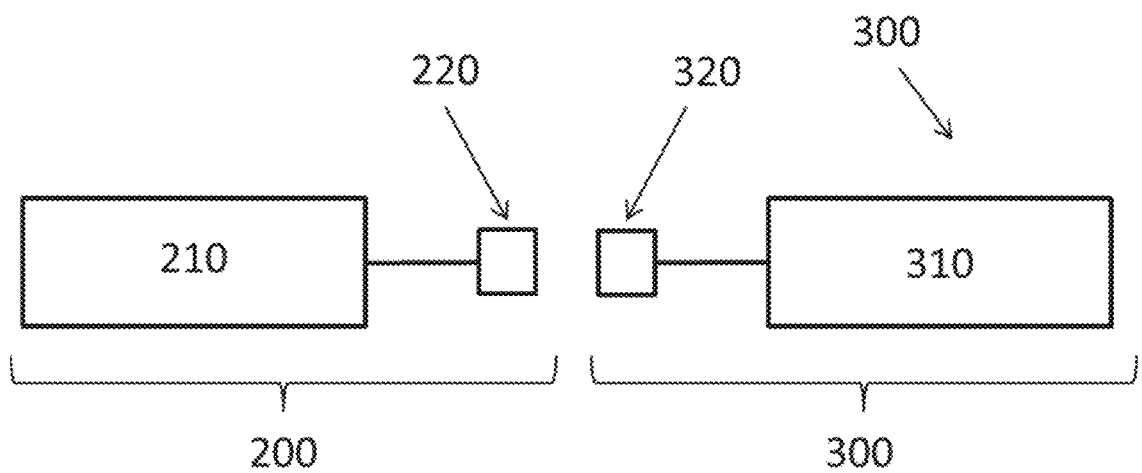
FIG. 1B illustrates gas sensor apparatus including a gas sensor module and a reader module according to some embodiments of the present disclosure in which the gas sensor module and reader module are electrically disconnected.

FIGS. 1A and 1B are schematic illustrations of a gas sensor apparatus 100 according to some embodiments of the present disclosure. The gas sensor apparatus comprises gas sensor module 200 comprising or consisting of a semiconducting gas sensor device 210 comprising a doped organic semiconducting layer and a reader module 300 electrically connected to the gas sensor module 200.

The semiconducting gas sensor device 210 may be, without limitation, a chemiresistor or a thin film transistor. A semiconducting layer of the device is doped.

In some embodiments, the gas sensor module 200 may be configured to electrically connect and disconnect from the reader module 300. In some embodiments, two electrodes of the semiconducting gas sensor device may be exposed or exposable, allowing for electrical connection to the reader module. In some embodiments, the gas sensor module 200 comprises a connector 220 configured to electrically connect the semiconducting gas sensor device 210 to the reader module 300. The connector 220 may be selected from, without limitation, a terminal block; and electrical connector, e.g. one of a plug and jack configured to connect to the other of a plug and jack of a connector 320 of the reader module.

A parameter of the semiconducting gas sensor device may be read upon connection to the reader.

In some embodiments, the gas sensor module 200 does not contain an electrical power source, e.g. a battery. The semiconducting gas sensor device may be powered via connection to the reader module for measurement of the response of the semiconducting gas sensor device to the environment. The reader module may contain a battery or may be connectable to a fixed power source.

FIGS. 1A and 1B illustrate a gas sensor apparatus according to some embodiments in which the gas sensor module and reader module are electrically connected for measurement of the semiconducting gas sensor device to the environment. In other embodiments, the reader module may be configured to wirelessly read the gas sensor module. The gas sensor module may comprise an RFID tag electrically connected to the semiconducting gas sensor device. The RFID tag may be a passive RFID tag configured to be powered wirelessly by electromagnetic energy emitted by an RFID reader.

A change in a parameter of the semiconducting gas sensor device, e.g. a change in resistance of the semiconducting gas sensor device, may be measured as a change in the amplitude and/or frequency of a signal from the RFID tag upon interrogation by a RFID reader.

The RFID tag may comprise a RC circuit in which the resistor is the semiconducting gas sensor device, e.g. a chemiresistor gas sensor.

The RFID reader may be configured to receive information from the gas sensor module other than a parameter of the semiconducting gas sensor device, e.g. a unique identification number stored in the chip of the RFID tag, e.g. in the case where a plurality of gas sensor modules are used, at the same time or at different times, within an environment.

The gas sensor module may comprise a reference semiconducting gas sensor device. In some embodiments, the reference semiconducting gas sensor device is sealed from the environment. In some embodiments, the reference semiconducting device comprises a layer comprising an absorbent material, e.g. a molecular sieve disposed between the organic semiconducting layer of the reference semiconducting device and the environment. The absorbent material may be a material capable of absorbing a target gas.

In some embodiments, the reference semiconducting gas sensor device may be the same as semiconducting gas sensor device 210 except that the organic semiconducting layer is undoped.

The gas sensor module may be a tag configured for single use and disposal after measurement.

In use, the gas sensor module may be applied to an object which is located in, or is to be located in, an environment containing a target gas that the semiconducting gas sensor device is responsive to, causing a change in a measureable parameter of the device.

The object may change upon exposure to the target gas. In some embodiments, the object is a fruit, e.g. a climacteric fruit, or a fruit container containing fruit which is not sealed from the environment that the gas sensor is exposed to. In some embodiments the environment may contain 1-methylcyclopropene (1-MCP) during at least some of the time that the object is exposed to the environment. 1-MCP may be present in the environment to retard ripening of climacteric fruit in the environment.

In some embodiments, the gas sensor module comprises an attachment element configured to attach the gas sensor to an object, e.g. the surface of a fruit container. The attachment element may be, without limitation, a mechanical attachment element such as a clip; or an adhesive, e.g. an adhesive disposed on a substrate of the semiconducting gas sensor device. In some embodiments, the semiconducting gas sensor device is flexible and the gas sensor module may be laminated to a surface of the object.

The present inventors have found that a semiconducting gas sensor device containing a doped semiconductor may give an irreversible response to a target gas that the device is responsive to.

Due to the irreversible nature of the response, the response may be a cumulative one in which the magnitude of the response may increase with time of exposure of the device to the target gas. The response may be proportional to the length of time that the device is exposed to a fixed concentration of the target gas. Accordingly, measurement of the response may be indicative of a cumulative (total) amount of target gas that the gas sensor has been exposed to.

Optionally, the device is not heated when exposed to the target gas.

The response may be determined by measuring a parameter of the semiconducting gas sensor device and comparing it to a parameter of the device before exposure to the environment.

In the case of a thin film transistor gas sensor device, the response may be, without limitation, a change in drain current; a change in resistance; a change in threshold voltage; a change in mobility; or a change in a transfer characteristic, e.g. output current vs input voltage. In the case of a chemiresistor gas sensor device, the response may be a change in resistance.

The parameter may be a directly measured property of the semiconducting gas sensor device, e.g. a measured resistance of the device. The parameter may be an indirectly measured property of the semiconducting device, e.g. an amplitude or frequency of an RFID device electrically connected to the semiconducting gas sensor device.

The response may be a change in a directly measured parameter. The response may be a change derived from a directly measured parameter.

The response of a device to a target gas may be calibrated, e.g. to give a response to the target gas per unit concentration of the target gas in the environment per unit time that the device is exposed to the gas. In some embodiments, due to the irreversibility of the response, calibration may be carried out using a device that is the same as the device to be placed in an environment to be measured. In some embodiments, calibration may be carried out by exposure of the device to a small amount of the target gas, e.g. at least 10 times less than an estimated amount of target gas that the device will be exposed to in use. This may be by exposure of the device to an environment containing a known concentration of the target gas for a short time and/or wherein the concentration of the target gas is low. Calibration may be carried out using a device made in the same batch as the device to be used for measurement.

Figure 2A:
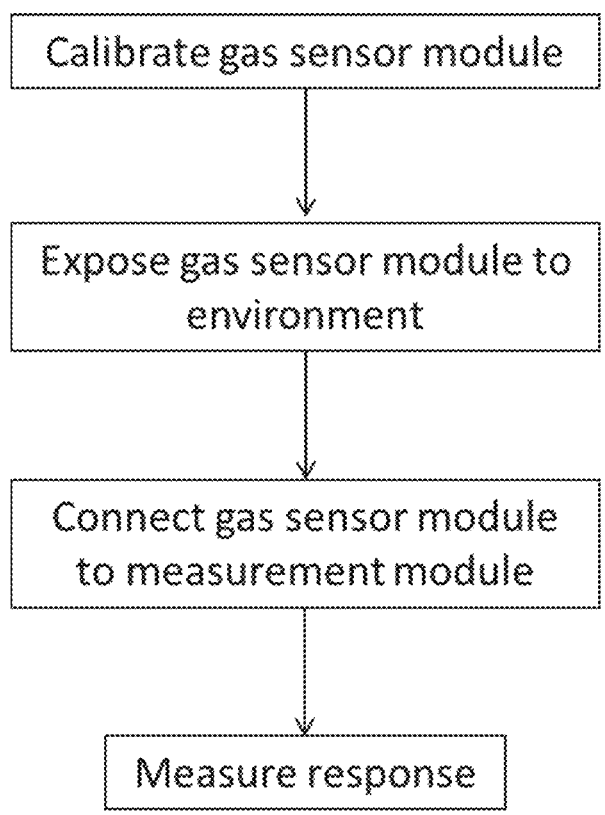
FIG. 2A illustrates a method of sensing a target gas according to some embodiments of the present disclosure in which a response of a gas sensor module to an environment is measured only once.

FIG. 2A illustrates a process for measuring an amount of a gas in an environment according to some embodiments.

A gas sensor module containing a semiconducting gas sensor device as described herein may, after an optional calibration step, be placed in an environment to be measured. The gas sensor module may be disconnected from the reader module when placed in the environment to be measured. After a time interval, the gas sensor module may be connected to the reader module and a parameter value of the device may be measured and compared to a starting parameter value of the device to determine a change in the parameter.

In some embodiments, for example as shown in FIG. 2A, the response of the gas sensor module is measured only once following a measurement time period after which the gas sensor module may be disposed of.

Figure 2B:
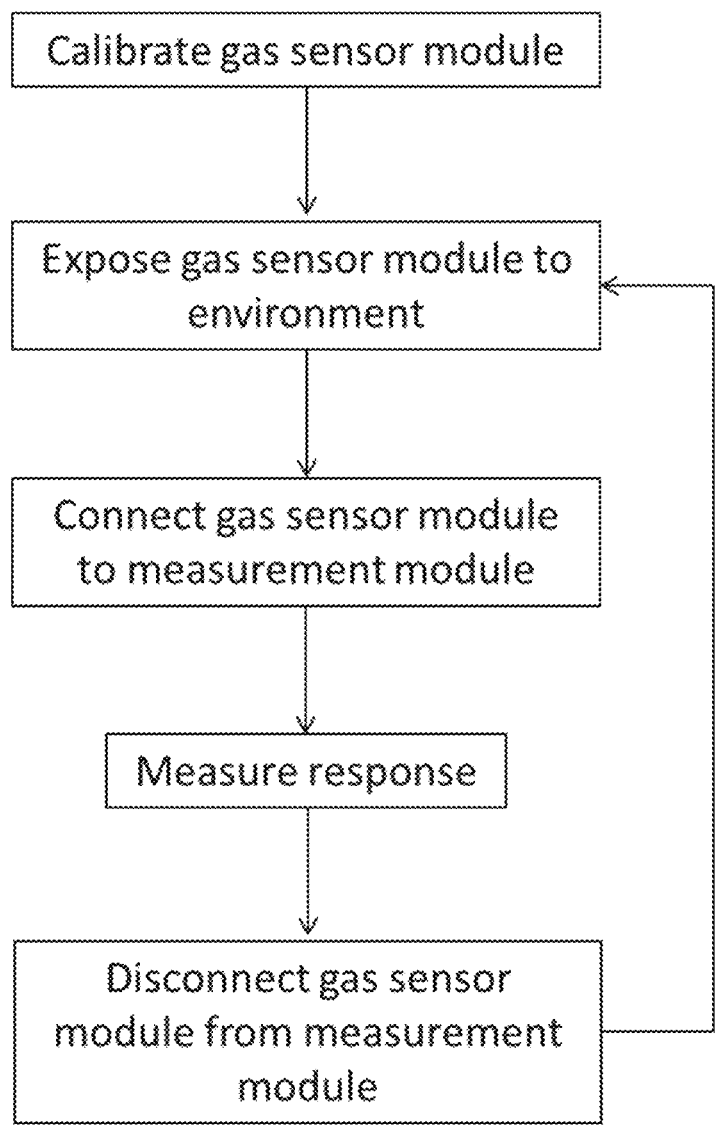
FIG. 2B illustrates a method of sensing a target gas according to some embodiments of the present disclosure in which a response of a gas sensor module to an environment is measured a plurality of times.

In some embodiments, for example as illustrated in FIG. 2B, the gas sensor module may be disconnected from the reader module following reading of the gas sensor module in a control environment and returned to the same environment or placed in a new environment. In some embodiments, wireless or wired connection of the gas sensor module to the reader module and reading of the gas sensor module response may be carried out a plurality of times during a measurement time period. Each measurement may be at a predetermined time interval of the time period. The determined change in the parameter may be adjusted using a change in the parameter for a reference gas sensor device sealed from the environment and/or a change in the parameter upon exposure of the device to a control environment.

The sensor module 200 may be moved to a controlled environment after the or each time interval for connection to the reader module 300 and measurement of the parameter, e.g. an environment which has a fixed temperature and humidity and/or which does not contain any gases that the semiconducting gas sensor device responds to. Measurement may be carried out after a predetermined period following removal of the sensor module from the environment being measured to allow the response of the gas sensor module to settle.

The irreversible, cumulative response of a semiconducting gas sensor device to a target gas as described herein allows for the device to be exposed to an environment without the need to monitor the response of the device while it is in the environment.

Connection and disconnection of the reader module from the gas sensor module allows for a plurality of gas sensor modules, e.g. single-use gas sensor modules which may be relatively cheap, to be used per reader module which may be relatively expensive. The gas sensor apparatus may be supplied as a kit containing one reader module and a plurality of gas sensor modules.

Measurements from a plurality of gas sensor modules distributed within an environment containing the gas may be combined to produce a gas distribution map of the environment showing variations in amounts of the gas that sensor modules at different locations within the environment are exposed to. Based on this information, objects may be redistributed within the environment to avoid areas in which the highest amount of target gas is measured if contact of the object with the target gas is undesirable, or to increase contact of the object with the target gas if contact of the object with the gas is desirable. If the target gas is introduced into the environment, e.g. if 1-MCP is introduced into an environment containing fruit, then the flow of the target gas into the environment may be adjusted based on a measured distribution map to increase uniformity of exposure to the gas within the environment.

Semiconducting Gas Sensor Device

In some embodiments, the semiconducting gas sensor device is a thin film transistor comprising a doped organic semiconducting layer.

In some embodiments, the semiconducting gas sensor device is a chemiresistor comprising a doped organic semiconducting layer.

The doped organic semiconducting layer may be in gas communication with gases in the atmosphere in which it is located. In some embodiments, at least part of a surface of the doped organic semiconducting layer is directly exposed to the atmosphere in which it is located when in use, i.e. there is no layer between the doped organic semiconducting layer and the at least part of the doped organic semiconducting layer surface. In some embodiments, one or more gas permeable layers are disposed between the atmosphere and a surface of the doped organic semiconducting layer.

Organic thin film transistor (OTFT) sensors may be bottom-gate organic thin film transistors (BG-OTFTs) or top gate organic thin film transistors.

Each OTFT may be a bottom contact or top contact device.

Figure 3:
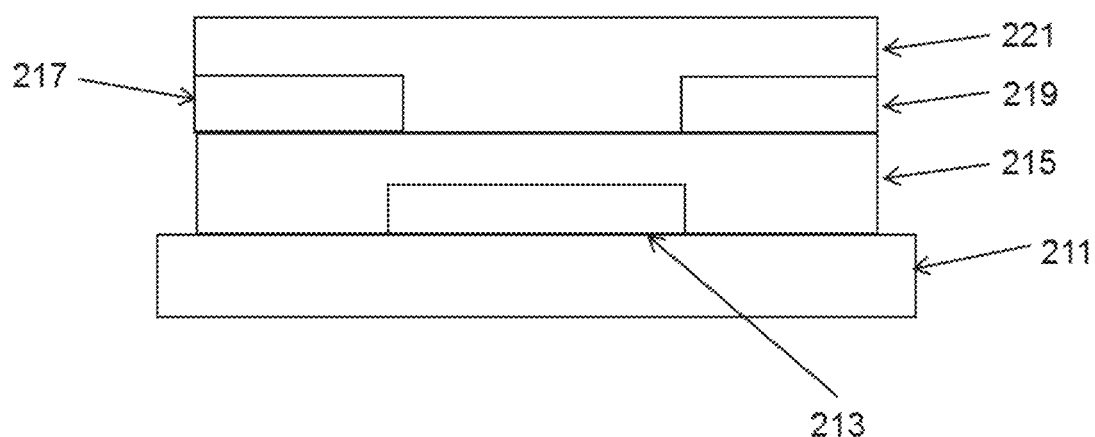
FIG. 3 illustrates a bottom gate, bottom contact organic thin film transistor gas sensor according to some embodiments of the present disclosure.

FIG. 3 is a schematic illustration of a bottom contact BG-OTFT gas sensor in accordance with some embodiments of the present disclosure. The bottom contact BG-OTFT comprises a gate electrode 213 supported on a substrate 211; source electrode 217 and gate electrode 219; a doped organic semiconductor layer 221 extending between the source and drain electrodes; and a dielectric layer 215 between the gate electrode and the source and drain electrodes. The doped organic semiconductor layer 221 may at least partially or completely cover the source and drain electrodes.

The length of the channel defined between the source and drain electrodes may be up to 500 microns. Preferably the channel length is less than 200 microns, more preferably less than 100 microns.

Figure 4:
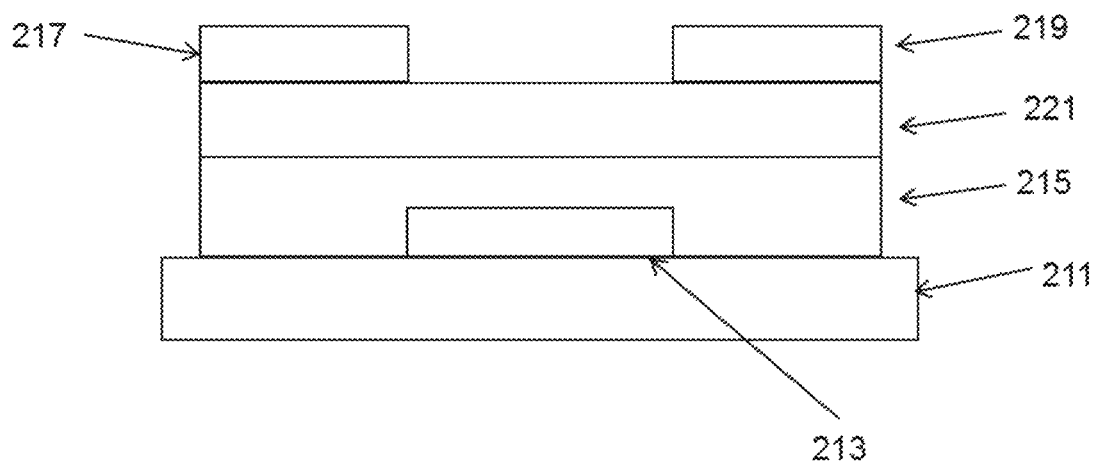
FIG. 4 illustrates a bottom gate, top contact organic thin film transistor gas sensor according to some embodiments of the present disclosure.

FIG. 4 is a schematic illustration of a top-contact BG-OTFT gas sensor according to some embodiments. The top-contact BG-OTFT is as described with reference to FIG. 3 except that the doped organic semiconductor layer 221 is between the dielectric layer 215 and the source and drain electrodes 217, 219.

Figure 5A:
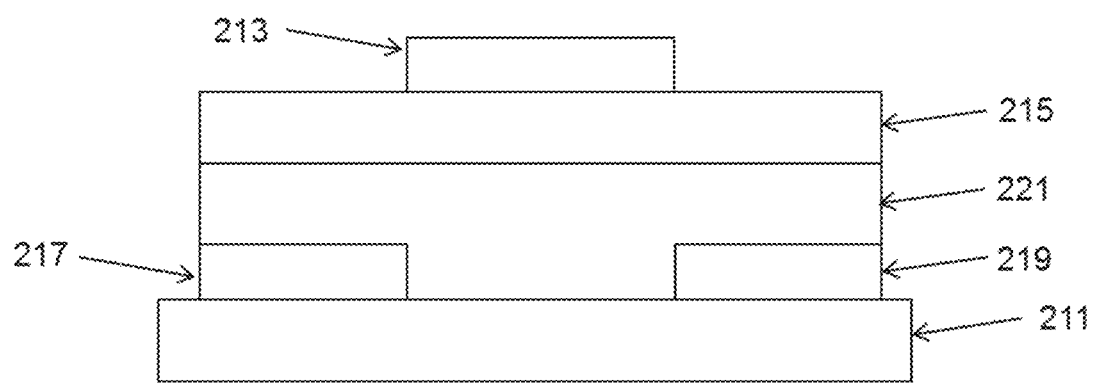
FIG. 5A illustrates a top gate, bottom contact organic thin film transistor gas sensor according to some embodiments of the present disclosure.

FIG. 5A is a schematic illustration of a top gate OTFT, bottom contact gas sensor in accordance with some embodiments of the present disclosure. The top gate, bottom contact OTFT comprises source and drain electrodes 217, 219; a doped organic semiconductor layer 221; and a dielectric layer 215 between the gate electrode 213 and the doped organic semiconductor layer. The dielectric layer of the top-gate OTFT is a gas-permeable material, preferably an organic material, which allows permeation of the gas or gases to be sensed through the dielectric layer to the doped organic semiconducting layer. In some embodiments, the gate electrode comprises a conducting material, e.g. a conducting polymer, which is permeable by the target gas. In some embodiments, the gate has apertures or gaps formed therein through which the target gas can pass, e.g. a comb-like structure defining conductive fingers having gaps therebetween through which the target gas can pass.

Figure 5B:
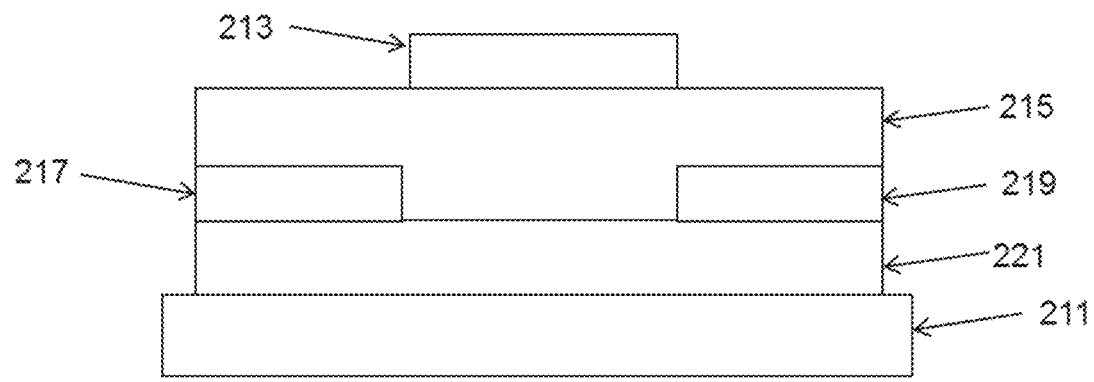
FIG. 5B illustrates a top gate, top contact organic thin film transistor gas sensor according to some embodiments of the present disclosure.

FIG. 5B is a schematic illustration of a top gate, top contact OTFT gas sensor in accordance with some embodiments of the present disclosure. The gas sensor of this embodiment is as described with reference to FIG. 5A except that the organic semiconducting layer 221 is disposed between the substrate 211 and the source and drain electrodes 217, 219.

Chemiresistors as described herein may be vertical or horizontal chemiresistors.

Figure 6A:
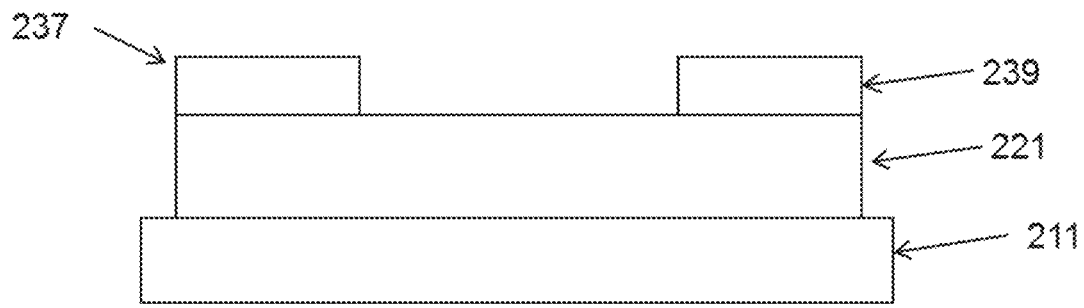
FIG. 6A illustrates a bottom contact horizontal chemiresistor gas sensor according to some embodiments of the present disclosure.

FIG. 6A illustrates a bottom contact horizontal chemiresistor gas sensor. By "bottom contact chemiresistor" as used herein is meant that electrodes of the chemiresistor lie between a substrate and an organic semiconducting layer of the chemiresistor.

The chemiresistor comprises first and second electrodes 237 and 239, respectively, and a doped organic semiconductor layer 221 disposed between and in electrical connection with the first and second electrodes. The first and second electrodes may be interdigitated. The chemiresistor may be supported on any suitable substrate 211, for example a glass or plastic substrate.

Figure 6B:
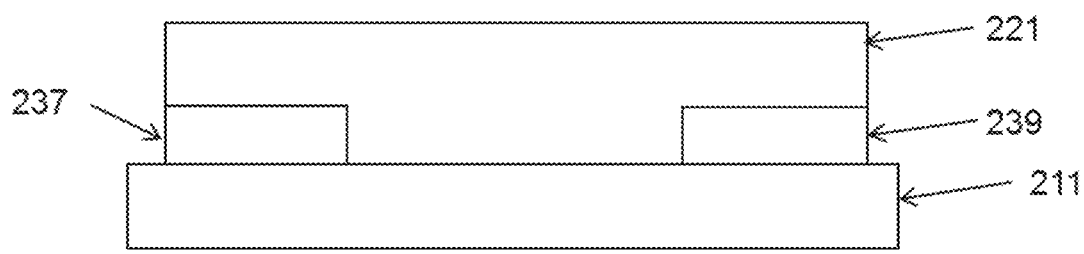
FIG. 6B illustrates a top contact horizontal chemiresistor gas sensor according to some embodiments of the present disclosure.

FIG. 6B illustrates a top contact horizontal chemiresistor gas sensor according to an embodiment. By "top contact chemiresistor" as used herein is meant that a doped organic semiconducting layer of the chemiresistor lies between electrodes and a substrate 211 of the chemiresistor. Integers of the chemiresistor of FIG. 6B are as described with reference to FIG. 6A.

In some embodiments, the first and second electrodes of a horizontal chemiresistor may be separated by a distance of between 5-500 microns, optionally 50-500 microns.

Figure 7:
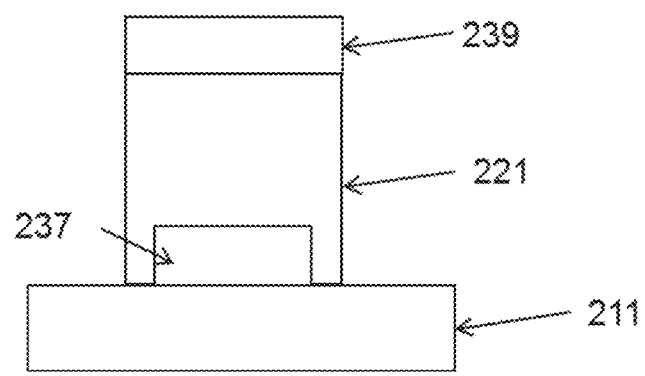
FIG. 7 illustrates a vertical chemiresistor gas sensor according to some embodiments of the present disclosure.

FIG. 7 illustrates a vertical chemiresistor gas sensor according to some embodiments. The chemiresistor comprises a first, bottom electrode 237; a second, top electrode 239 over the first electrode; and a doped organic semiconductor layer 221 between, and in electrical connection with, the first and second electrodes. The bottom electrode 237 lies between the substrate 211 and both the organic semiconducting layer 221 and the second, top electrode 239. In some embodiments, the top electrode comprises a conducting material, e.g. a conducting polymer, which is permeable by the target gas. In some embodiments, the top electrode has apertures or gaps formed therein through which the target gas can pass, e.g. a comb-like structure defining conductive fingers having gaps therebetween through which the target gas can pass.

In some embodiments, the first and second electrodes of a vertical chemiresistor as described herein may be separated by a distance of between 20 nm-10 microns, optionally 50-500 nm.

Semiconductor Layer

The semiconductor layer of gas sensors described herein may comprise or consist of a doped organic semiconductor.

The doped organic semiconductor may be a non-degenerate extrinsic semiconductor. Optionally, the semiconductor:dopant weight ratio is in the range 90:10-99.9:0.1, optionally 95:5-99.5:0.5.

The organic semiconductor may be partially or completely doped.

In some embodiments, at least part of the doped organic semiconducting layer is not doped. In some embodiments, the highest doping of the organic semiconductor layer is at a surface thereof, optionally in the area of overlap between one or more electrical contacts and the organic semiconducting layer, e.g. one or both contacts of a chemiresistor or the source and drain electrodes of an organic TFT. In some embodiments, a dopant is immobilised on the surface of the one or more contacts and the organic semiconducting layer is selectively doped in at least part of an overlap area between the one or more contacts and the organic semiconducting layer.

The organic semiconducting layer of the semiconducting gas sensor device may be p-doped.

Exemplary p-dopants include, without limitation, TCNQ and fluorinated derivatives thereof, for example $F_4TCNQ$; $Mo(tfd)_3$; and partially fluorinated fullerenes, for example $C_{60}F_{36}$.

Organic semiconductors as described herein may be selected from conjugated non-polymeric semiconductors; polymers comprising conjugated groups in a main chain or in a side group thereof; and carbon semiconductors such as graphene and carbon nanotubes or combinations thereof, e.g. a combination of a carbon semiconductor with one or both of a polymer semiconductor and a conjugated non-polymeric semiconductor.

An organic semiconductor layer of an organic semiconducting gas sensor device as described herein may comprise or consist of a semiconducting polymer and/or a non-polymeric organic semiconductor. The organic semiconductor layer may comprise a blend of a non-polymeric organic semiconductor and a polymer. Exemplary organic semiconductors are disclosed in WO 2016/001095, the contents of which are incorporated herein by reference.

The organic semiconducting layer of a semiconducting gas sensor device may be deposited by any suitable technique, including evaporation and deposition from a solution comprising or consisting of one or more organic semiconducting materials and at least one solvent. Exemplary solvents include benzenes with one or more alkyl substituents, preferably one or more $C_{1-10}$ alkyl substituents, such as toluene and xylene; tetralin; and chloroform. Solution deposition techniques include coating and printing methods, for example spin coating dip-coating, slot-die coating, ink jet printing, gravure printing, flexographic printing and screen printing.

Optionally, the organic semiconducting layer of an organic thin film transistor has a thickness in the range of about 10-200 nm.

Electrodes

The first and second electrodes of a chemiresistor, or the source and drain electrodes of a TFT, can be selected from a wide range of conducting materials for example a metal (e.g. gold), metal alloy, metal compound (e.g. indium tin oxide) or conductive polymer.

In the case of an OTFT, the gate electrode may be selected from any conducting material, for example a metal (e.g. aluminium), a metal alloy, a conductive metal compound (e.g. a conductive metal oxide such as indium tin oxide) or a conductive polymer.

Dielectric Layer

The dielectric layer of an OTFT gas sensor device as described herein comprises a dielectric material. The dielectric material may be organic, inorganic or a mixture thereof. Preferred inorganic materials include $SiO_2$, SiNx and spin-on-glass (SOG). Preferred organic materials are polymers and include insulating polymers such as poly vinylalcohol (PVA), polyvinylpyrrolidine (PVP), acrylates such as polymethylmethacrylate (PMMA) and benzocyclobutanes (BCBs), poly(vinyl phenol) (PVPh), poly(vinyl cinnamate) P(VCn), fluorinated polymers, e.g. a homopolymer or copolymer of tetrafluoroethene such as a tetrafluoroethene-perfluorodimethyldioxol (PDD) copolymer such as Teflon AF2400 or poly(vinylidene fluoride-co-hexafluoropropylene) P(VDF-HFP), P(VDF-TrFE-CTFE), and self-assembled monolayers, e.g. silanes, on oxide. The polymer may be crosslinkable. The insulating layer may be formed from a blend of materials or comprise a multi-layered structure. In the case of a bottom-gate device, the gate electrode may be reacted, for example oxidised, to form a dielectric material.

The dielectric material may be deposited by thermal evaporation, vacuum processing or lamination techniques as are known in the art. Alternatively, the dielectric material may be deposited from solution using, for example, spin coating or ink jet printing techniques and other solution deposition techniques discussed above. In the case of a bottom gate OTFT, the dielectric material should not be dissolved if an organic semiconductor is deposited onto it from solution. In the case of a top-gate OTFT, the organic semiconductor layer should not be dissolved if the dielectric is deposited from solution.

Techniques to avoid such dissolution include: use of orthogonal solvents for example use of a solvent for deposition of the organic semiconducting layer that does not dissolve the dielectric layer in the case of a bottom gate device or vice versa in the case of a top gate device; cross linking of the dielectric layer before deposition of the organic semiconductor layer in the case of a bottom gate device; or deposition from solution of a blend of the dielectric material and the organic semiconductor followed by vertical phase separation as disclosed in, for example, L. Qiu, et al., Adv. Mater. 2008, 20, 1141.

The thickness of the dielectric layer is preferably less than 2 micrometres, more preferably less than 500 nm.

The substrate of a semiconducting gas sensor device as described herein may be any electrically insulating substrate, optionally glass or plastic.

EXAMPLES

Chemiresistor Gas Sensor Device

Gold contacts having a width of 2 mm and a separation of 140 microns were evaporated through a shadow mask onto a PEN substrate. A 200 nm thick layer of Semiconducting Polymer 1 (95 weight %) and p-dopant Mo(tfd)3 (5 weight %) was deposited onto the contacts by spin-coating from a 1% w/v solution in 1,2,4-trimethylbenzene.

The resistance of the device at 1V was measured once every 25 seconds in humid air flow at about 8° C. After 4 hours, the device was exposed to 1 ppm of 1-MCP in humid air for 2 hours, reverting thereafter to humid air without 1-MCP.

Figure 8:
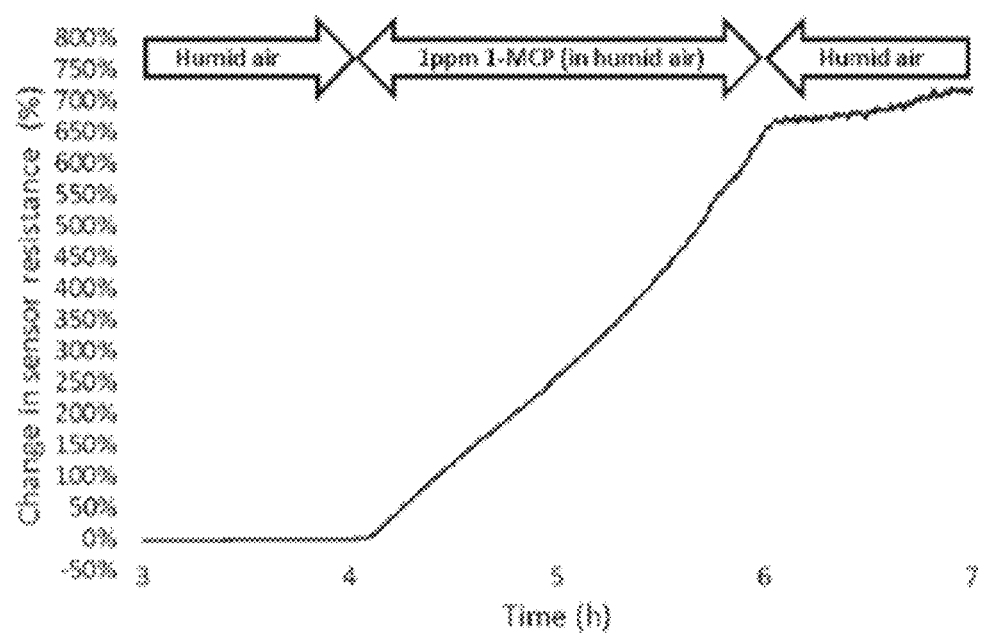
FIG. 8 is a graph of resistance vs time of a chemiresistor according to some embodiments of the present disclosure exposed to 1-methylcyclopropene.

With reference to FIG. 8, resistance of the device increases linearly during the time period that the device is exposed to 1-MCP. The increase in resistance does not reverse when the device is no longer exposed to 1-MCP, allowing for the device to be exposed to 1-MCP without actively measuring the response of the device during the exposure period.

Measurement of the response to 1-MCP of a chemiresistor as described above but in which the organic semiconducting layer is not doped was not feasible because of the high resistance of the undoped device, resulting in no current distinguishable from noise at voltages below 10V.

For the purpose of comparison, a top-gate OTFT was formed in which the semiconducting layer was not doped.

To form the OTFT, a PEN substrate was baked in a vacuum oven and then UV-ozone treated for 30 seconds. Source and drain contacts were deposited onto the substrate by thermal evaporation of 3 nm Cr followed by 20 nm Au through shadow masks with channel length of 125 μm and a channel width of 4 mm. Semiconducting Polymer 1 was deposited by spin coating from a 1% w/v solution in 1,2,4-trimethylbenzene to a thickness of 40 nm and dried at 100° C. for 10 minutes in air. The polymer dielectric Teflon® AF2400 was spin coated from a 2.5% w/v solution in a 50:50 v/v blend of Fluorinert™ fluorinated solvents FC43 and FC770 available from 3M to a 300 nm thickness and dried at 80° C. for 10 min, after a 5 minute initial drying phase while spinning. The gate was formed by thermal evaporation of Cr (3 nm) followed by Al (200 nm) through a shadow mask to form a gate electrode having a comb structure with comb fingers of 125 microns width and gaps of 125 microns between fingers.

The OTFT was operated at ca. 10 nA with both gate and drain voltages set at −4V.

Figure 9:
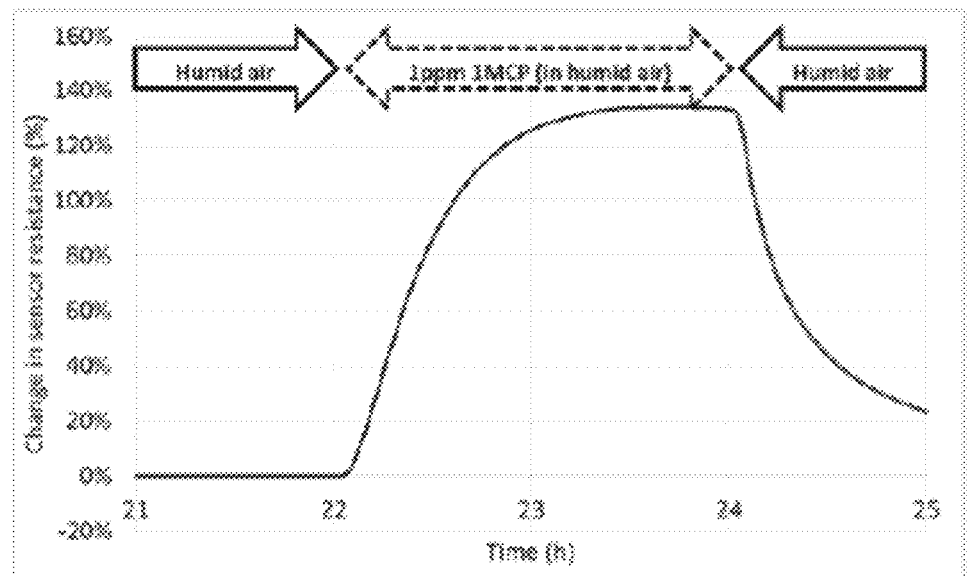
FIG. 9 is a graph of change in resistance vs. time for an undoped top-gate organic thin film transistor.

With reference to FIG. 9, the OTFT provides a response to an environment containing 1 PPM of 1-MCP, measured as a change in resistance of the OTFT, however: (a) a saturation point is reached after a period of time, and (b) the response is reversible, with the change decaying towards 0 upon removal from the environment containing 1-MCP, indicating unsuitability of the OTFT for measurement other than a continuous measurement.

The invention claimed is:

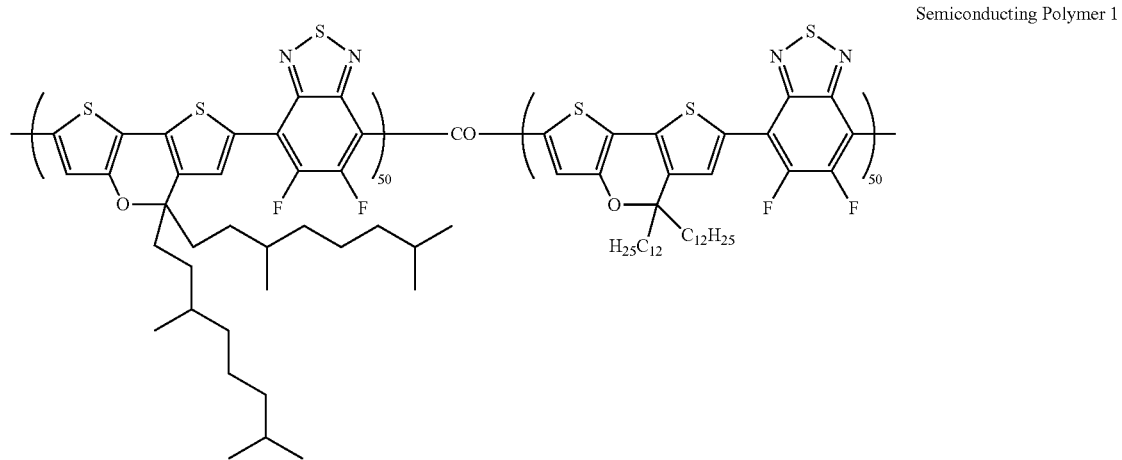

Semiconducting Polymer 1

1. A method of sensing a target gas in an environment, the method comprising measuring a response for each of a plurality of semiconducting gas sensor devices attached to different objects and exposed to the environment at the same time, the semiconducting gas sensor devices comprising first and second electrodes in electrical contact with a doped organic semiconductor layer, wherein the measured response is indicative of a cumulative amount of the target gas that the semiconducting gas sensor device has been exposed to, wherein a response of a reference device which has not been exposed to the target gas is subtracted from the response of each semiconducting gas sensor device.

2. The method according to claim 1 wherein the semiconducting gas sensor device is an organic thin film transistor and the first and second electrodes are, respectively, source and drain electrodes of the thin film transistor.

3. The method according to claim 2 wherein the response is a change in one or more of drain current; a resistance; a threshold voltage; a mobility; or a transfer characteristic.

4. The method according to claim 1 wherein the semiconducting gas sensor device is attached to an object in the environment.

5. The method according to claim 4 wherein the object is a harvested flower, harvested vegetable, harvested fruit or a container thereof.

6. The method according claim 1 wherein the response is measured after the exposure of the semiconducting gas sensor to the environment, and wherein the semiconducting gas sensor is not connected to a reader configured to read the response during exposure to the environment.

7. The method according to claim 6 wherein the response is measured in an environment in which the target gas is not present.

8. The method according to claim 1 wherein the semiconducting gas sensor is not connected to a source of electrical energy during at least part of the exposure of the semiconducting gas sensor to the environment.

9. The method according to claim 1 wherein the target gas is 1-methylcyclopropene.

10. Gas sensor apparatus comprising a gas sensor module and a reader module circuit connectable to the gas sensor module wherein the gas sensor module comprises a semiconducting gas sensor device comprising first and second electrodes in electrical contact with a doped organic semiconductor layer and wherein the reader module circuit is configured to measure a parameter of the semiconducting gas sensor device upon connection to the gas sensor module.

11. The gas sensor apparatus according to claim 10 wherein the semiconducting gas sensor device is an organic thin film transistor.

12. The gas sensor apparatus according to claim 11 wherein the parameter is one or more of a drain current, a threshold voltage; a mobility; a resistance and a transfer characteristic.

13. The gas sensor apparatus according to claim 10 wherein the reader module circuit is configured to provide electrical power to the semiconducting gas sensor device when connected to the gas sensor module.

14. The gas sensor apparatus according to claim 10 wherein the gas sensor module comprises a RFID label.

15. A gas sensor kit comprising a reader module and a plurality of gas sensor modules according to claim 10.

* * * * *